United States Patent
Li

(10) Patent No.: US 12,543,724 B1
(45) Date of Patent: Feb. 10, 2026

(54) ANT CONTROL BOX

(71) Applicant: Shu-Jhih Li, Taichung (TW)

(72) Inventor: Shu-Jhih Li, Taichung (TW)

( * ) Notice: Subject to any disclaimer, the term of this patent is extended or adjusted under 35 U.S.C. 154(b) by 0 days.

(21) Appl. No.: 19/012,932

(22) Filed: Jan. 8, 2025

(51) Int. Cl.
*A01M 29/10* (2011.01)

(52) U.S. Cl.
CPC ....... *A01M 29/10* (2013.01); *A01M 2200/011* (2013.01)

(58) Field of Classification Search
CPC ...... A01M 29/10; A01M 29/08; A01M 29/06; A01M 29/00; A01M 1/103
See application file for complete search history.

(56) References Cited

U.S. PATENT DOCUMENTS

| | | | | |
|---|---|---|---|---|
| 2006/0273172 A1* | 12/2006 | Helez | ................... | A01M 29/10 235/439 |
| 2008/0067244 A1* | 3/2008 | Marks | ................... | G01V 15/00 235/385 |
| 2009/0190355 A1* | 7/2009 | DeGinto | ............... | A01M 29/10 362/276 |
| 2013/0318636 A1* | 11/2013 | Zhou | ..................... | A01M 29/34 726/34 |
| 2022/0061307 A1* | 3/2022 | Daubeney | ............. | A01M 29/18 |

FOREIGN PATENT DOCUMENTS

| | | | | |
|---|---|---|---|---|
| CN | 211126694 U | * | 7/2020 | ............. F21V 33/00 |
| WO | WO-2018006132 A1 | * | 1/2018 | ......... G08B 13/1672 |

* cited by examiner

*Primary Examiner* — Peter M Poon
*Assistant Examiner* — Carly W. Lynch
(74) *Attorney, Agent, or Firm* — WPAT, PC

(57) ABSTRACT

An ant control box includes a box body having a housing space therein; and a lamp disposed in the housing space and capable of emitting a light covering at least 80% of a total area of the housing space for interfering with activity of ants. With such configuration, the present disclosure effectively prevents ants from gathering and nesting inside the box through the light illumination, thereby avoiding interference with equipment, achieving a non-chemical and environmentally friendly ants repellent effect.

6 Claims, 7 Drawing Sheets

ANT CONTROL BOX

BACKGROUND OF THE DISCLOSURE

1. Field of the Disclosure

The present disclosure relates to boxes, and more particularly, to an ant control box.

2. Description of the Related Art

In recent years, due to multiple factors such as the use of agricultural chemicals and herbicides, development in hill areas, and climate change, population of ants gradually becomes uncontrollable, causing serious infestation issues in many counties and cities in the country. Ants tend to gather and build nests in enclosed and dark spaces, such as power distribution boxes, leading to damage of electrical equipment or electrical short circuits, increasing operation and use associated risks.

In the past, pesticides or chemicals were used for pest control. Although these methods were effective in suppressing the ants population in the short term, such chemicals are not environmentally friendly and may cause adverse effects on human health. As for another common method, sugar containing borax or boric acid is used as bait and placed in areas frequently visited by ants. However, frequent replacement is required by this method, and it is difficult to maintain a clean environment. Also, such method is unsuitable for use around electrical equipment or in moisture sensitive areas.

SUMMARY OF THE DISCLOSURE

The present disclosure aims at resolving issues of equipment damage caused by ants gathering and nesting inside the box.

For achieving the aforementioned objectives, an embodiment of the present disclosure provides an ant control box, comprising:
- a box body having a housing space therein; and
- a lamp disposed in the housing space and capable of emitting a light covering at least 80% of a total area of the housing space for interfering with activity of ants.

With such configuration, the present disclosure effectively prevents ants from gathering and nesting inside the box through the light illumination, thereby avoiding interference with equipment operation and reducing the risk of damage to electrical devices. Also, using light to interfere with the visual system of ants, the present disclosure realizes a continuous and stable repellent effect without the use of chemical agents, thereby contributing to environmental protection and reducing adverse impacts on human health.

DETAILED DESCRIPTION OF THE DISCLOSURE

The aforementioned and further advantages and features of the present disclosure will be understood by reference to the description of the preferred embodiment in conjunction with the accompanying drawings where the components are illustrated based on a proportion for explanation but not subject to the actual component proportion.

Figure 1:
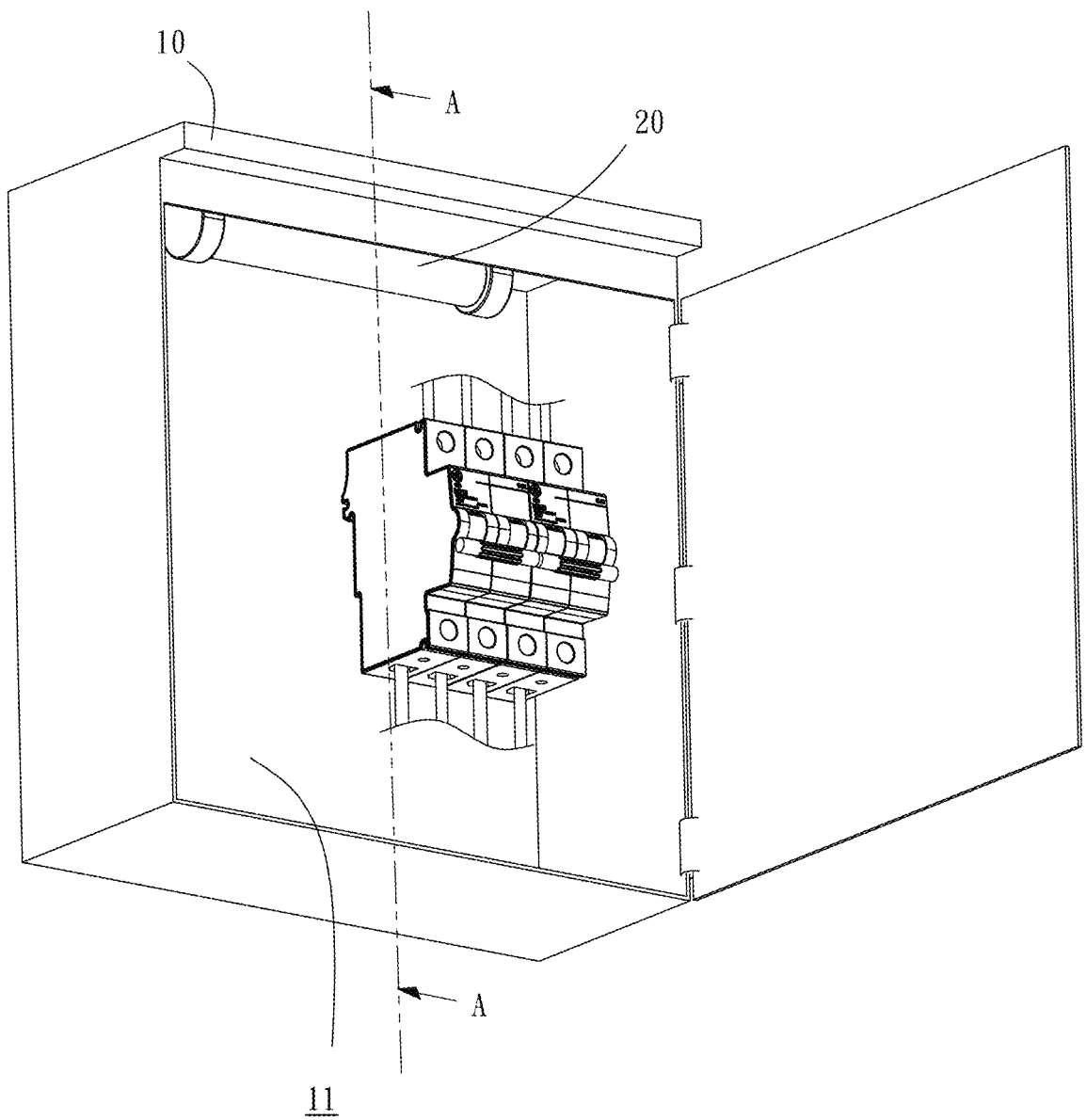
FIG. 1 is a perspective view of the ant control box in accordance with an embodiment of the present disclosure.

Referring to FIG. 1, an ant control box is disclosed, comprising a box body 10 and a lamp 20. The box body 10 has a housing space 11 therein, with the lamp 20 disposed in the housing space 11. The lamp 20 is capable of emitting a light covering at least 80% of the total area of the housing space 11 for interfering with the activities of ants.

Therein, the lamp 20 is selected from an LED light, an ultraviolet light, a fluorescent light, or a combination thereof. The wavelength of the LED light ranges between 265 nm to 700 nm; the wavelength of the UV light ranges between 100 nm to 400 nm; the wavelength of the fluorescent light ranges between 400 nm to 700 nm. Also, LED light, UV light, and fluorescent light having different wavelengths are able to be placed simultaneously to achieve a greater ant control effect.

With such configuration, the light covering most of the area within the box body 10 is emitted to affect the behaviors of ants. Ants have compound eyes, which are structurally different from human eyes and formed of many small eyes, and each small eye has its own light receptor. When a light is emitted in a confined space, the light is continuously and repeatedly reflected, and the continuously and repeatedly reflected light will interfere with the behavior and visual ability of ants, which are sensitive to light, thereby affecting the activities of ants.

By using physical light to suppress behaviors of ants, compared with chemical pesticides, such method is more environmentally friendly and non-toxic, and effectively reduces the potential environmental harm. Also, such method is allowed to be applied to boxes containing precise electronic components, low-voltage boxes, power distribution boxes, transformer boxes, optical splice boxes, or other boxes forming a sealed space, such as piano boxes and speaker boxes requiring proper maintenance.

Figure 2:
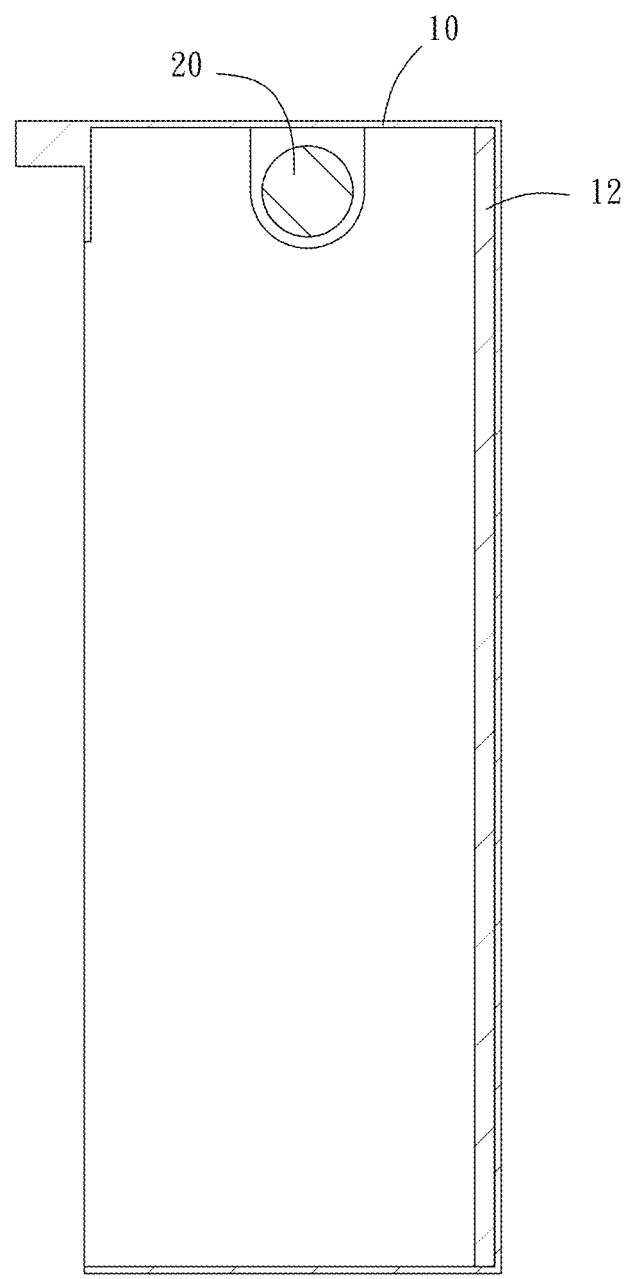
FIG. 2 is a cross-sectional view taken along line A-A in FIG. 1.

Referring to FIG. 2, a reflection layer 12 is disposed on the inner surface of the box body 10 to increase the reflection rate of the light emitted from the lamp 20. The reflection layer 12 effectively increases the distribution of lights within the box body 10, so as to ensure that the light covers all corners within the box body 10, reducing blind spots caused by insufficient light, and thereby improving the effect of interference with the activities of ants.

Figure 3:
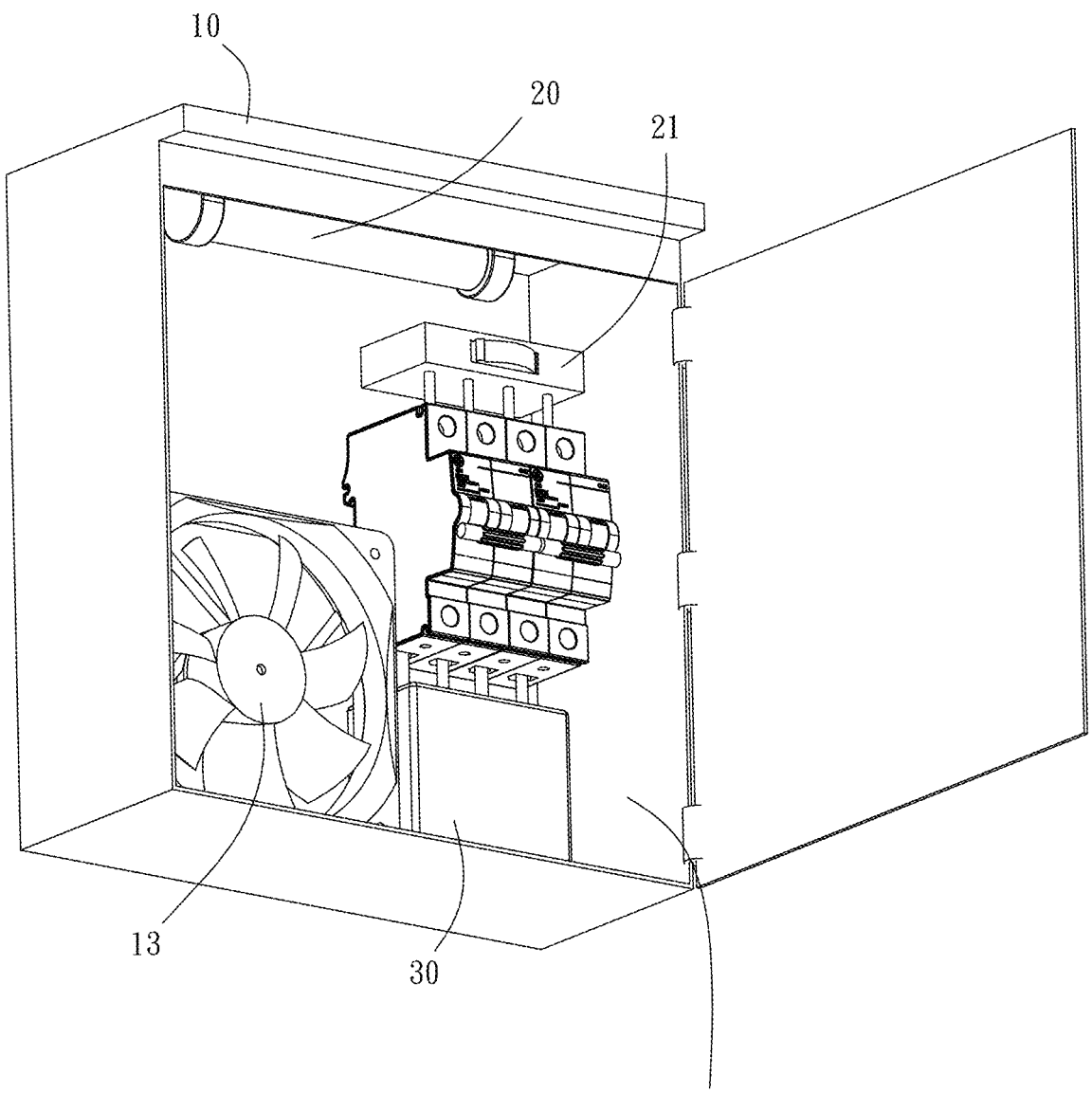
FIG. 3 is a perspective view of the ant control box in accordance with another embodiment of the present disclosure.

Referring to FIG. 3, a fan 13 is disposed in the box body 10. The fan 13 helps to stir the airflow and disturbs the pheromone in the air, thereby achieving the ant interfering effect.

Figure 4:
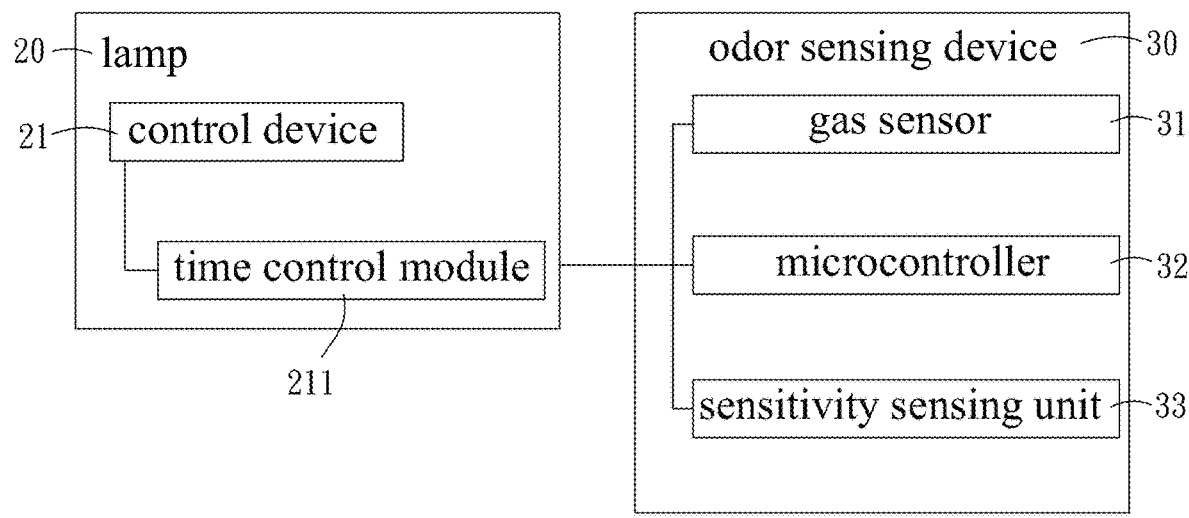
FIG. 4 is a block diagram of the lamp electrically connected with the odor sensing device in accordance with an embodiment of the present disclosure.

Referring to FIG. 3 and FIG. 4, the lamp 20 comprises a control device 21. The control device 21 is configured to adjust the luminous intensity and the on/off state of the lamp 20. By controlling the luminous intensity and the on/off state of the lamp 20, the lamp 20 is flexibly adjusted based on the activity natures of ants, thereby reducing energy consumption and ensuring effective interference with ant behaviors.

Referring to FIG. 3 and FIG. 4, the control device 21 further comprises a time control module 211. The time control module 211 is configured to set a scheduled on and off timing of the lamp 20. Using the time control mechanism, the present disclosure effectively saves energy and precisely carries out the interference operation during the peak duration of ant activities, thereby improving the specificity of ant control effect.

Referring to FIG. 3 and FIG. 4, an odor sensing device 30 is disposed in the box body 10. The odor sensing device 30 comprises a gas sensor 31 and a microcontroller 32. The gas sensor 31 is used to detect pheromones of ants. The microcontroller 32 is electrically connected with the gas sensor 31 and the lamp 20. The microcontroller 32 is used to process the signal from the gas sensor 31. When the signal reaches a predetermined threshold value, the microcontroller 32 sends a signal to activate the lamp 20, and the lamp 20 continuously operates. When the aforementioned signal falls under the threshold value, the microcontroller 32 sends a signal to shut down the lamp 20. With such configuration, the odor sensing device 30 accurately detects the pheromones of ants, and the lamp 20 is automatically turned on and off according to the concentration of the detected pheromones, so as to achieve the optimal interference effects. Such automated response system ensures that the reaction will be triggered when the population of ants reaches a certain threshold value, achieving a highly effective ant control and avoiding energy waste.

Referring to FIG. 3 and FIG. 4, the odor sensing device 30 further comprises a sensitivity sensing unit 33. The sensitivity sensing unit 33 is electrically connected with the gas sensor 31. The sensitivity sensing unit 33 is used to adjust the sensitivity of the gas sensor 31 detecting the pheromones of ants. Under different environments, the concentration of pheromones released by ants varies. Therefore, the sensitivity sensing unit 33 is allowed to adjust the sensing sensitivity according to actual conditions, thereby improving the detection accuracy.

Figure 5:
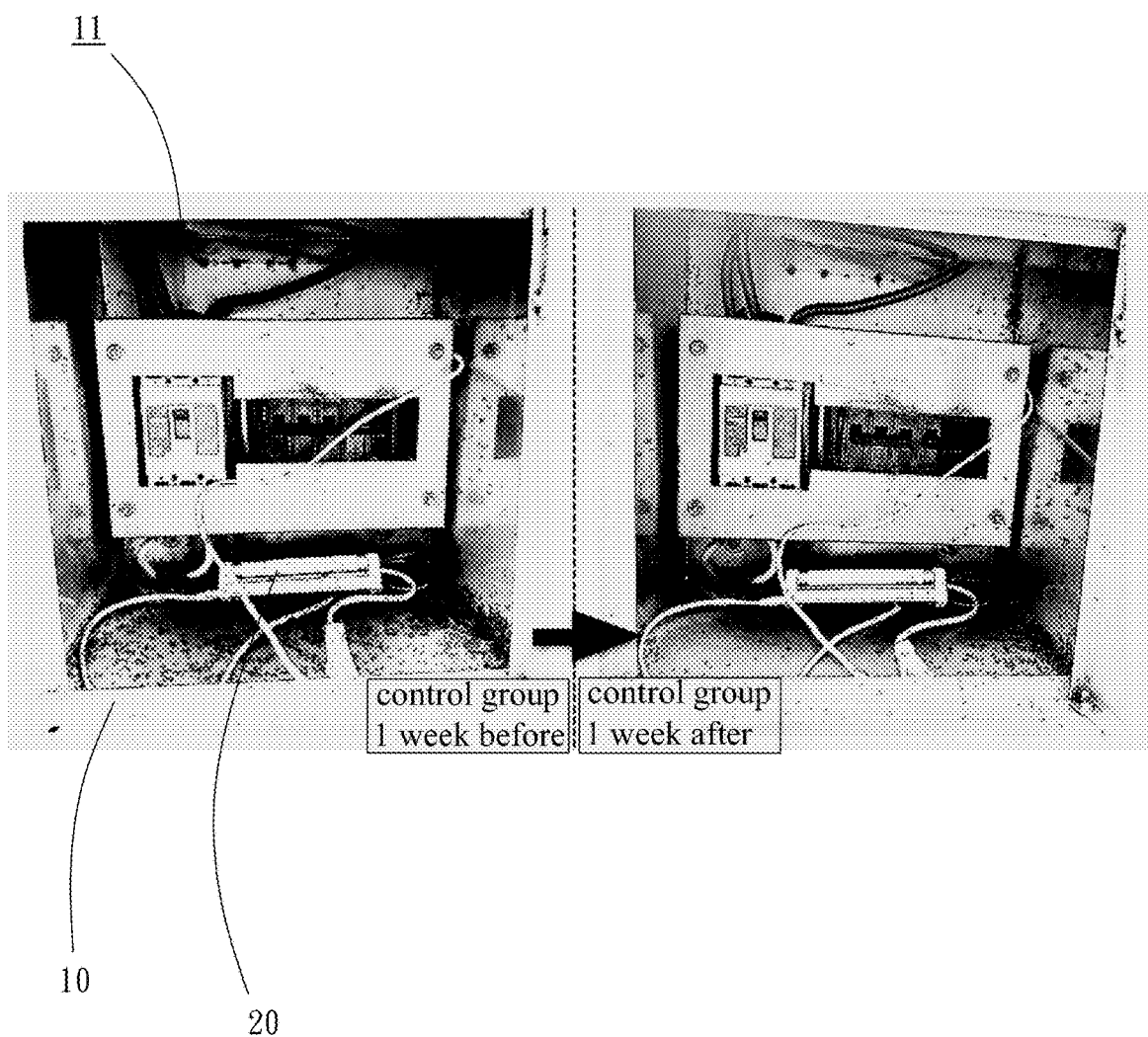
FIG. 5 is a schematic view illustrating comparison of the ant control box using an unlit fluorescent light as a control group before and after one week.
Figure 6:
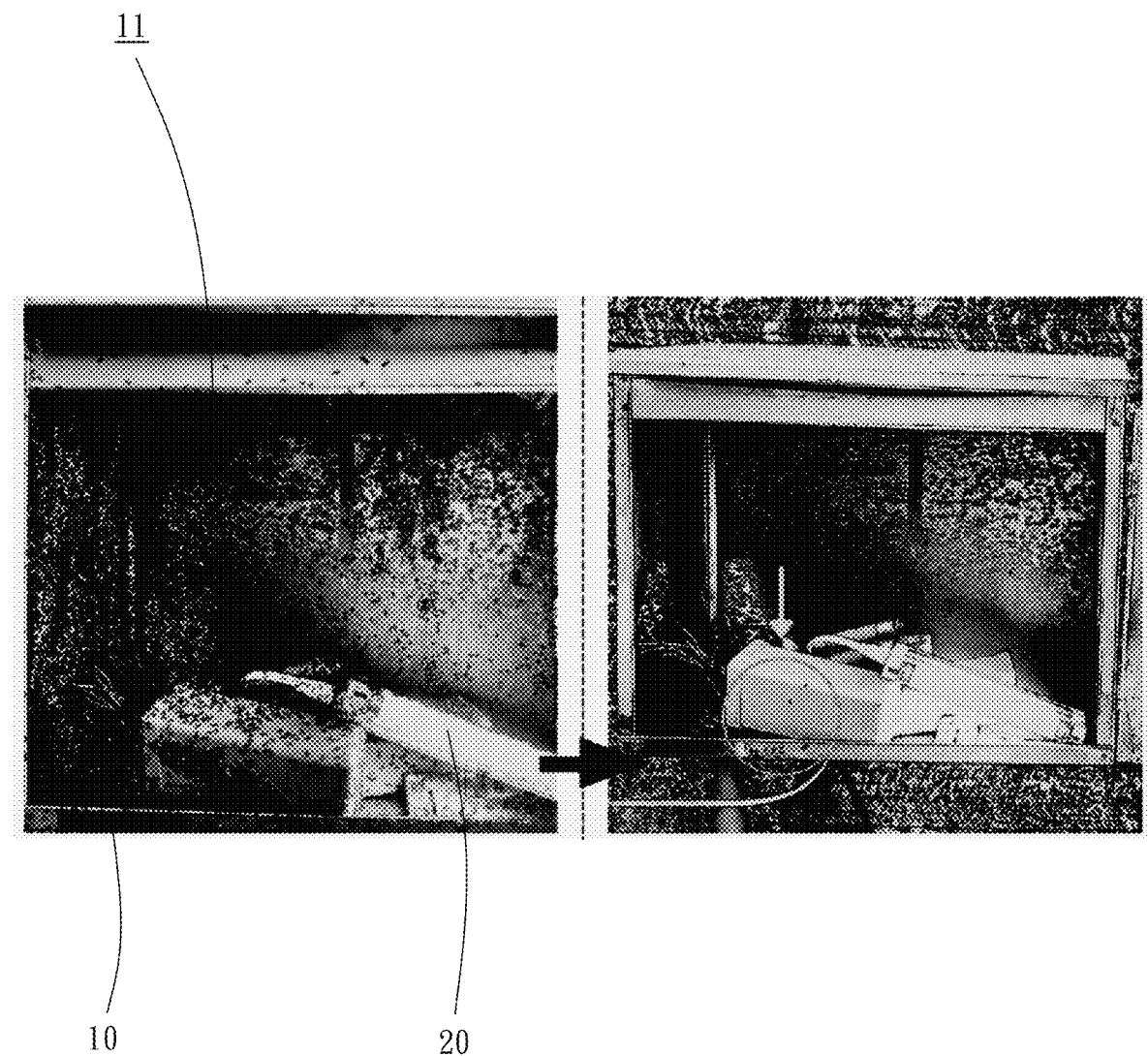
FIG. 6 is a schematic view illustrating comparison of the ant control box using a fluorescent light before and after one week.
Figure 7:
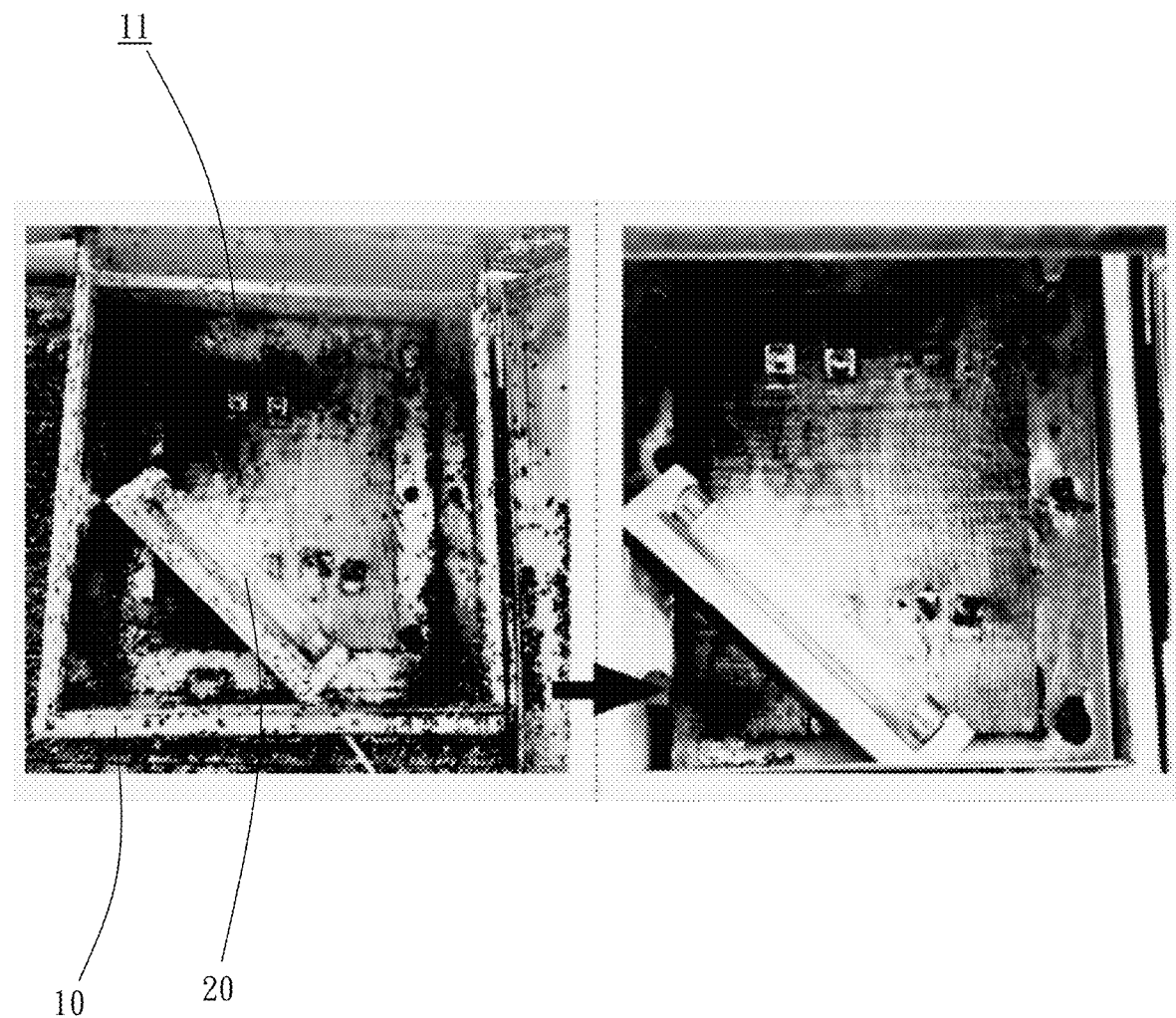
FIG. 7 is a schematic view illustrating comparison of the ant control box using an ultraviolet light before and after one week.

Referring to FIG. 5 to FIG. 7, the experiment subjects are divided into three groups, namely the control group, the fluorescent light group, and the UV light group, so as to assess the effects of different light sources imposed on the *Dolichoderus thoracicus* (hereafter referred to as ants) inside the box body 10. The box body 10 used in the experiment is a power distribution box. The setup of the experiment includes power distribution boxes (i.e., the box body 10) containing over 1000 ants, so as to be observed under the control group, the fluorescent light group, and the UV light group. If the experimental results show that light illumination or certain light source effectively reduces ant population, such method can be applied to reduce the damage caused by ants to the wires in the power distribution box. The control group is equipped with light tubes that are not turned on. Due to differences in the thermal effect of the light tubes, the average temperature of the control group is 3.5 degrees Celsius to 4 degrees Celsius lower than the temperature of the fluorescent light group and the UV light group, wherein the average temperature of the fluorescent light group and the UV light group are almost the same. However, the average temperature of all three groups above ranges from 23.3 degrees Celsius to 33.3 degrees Celsius, which is within the normal range of natural environmental background; in other words, the average temperature of the three groups falls within the temperature range of normal ant activities. Therefore, the effect caused by temperature difference is considered negligible.

Further, the average humidity of the three groups above ranges from 49.9% to 89.1%. The average humidity of the control group is 11% to 17.5% higher than the average humidity of the fluorescent light group and the UV light group, which is also estimated to be caused by the thermal effect of the light tubes. However, the average humidity of all three groups is within the normal range of natural environmental background; in other words, the average humidity of the three groups falls within the humidity range or normal ant activities. Therefore, the effect caused by humidity difference is considered negligible.

Referring to FIG. 5, when the lamp 20 is not turned on, the difference occurs in the control group before and after a one-week duration is little.

Referring to FIG. 6, under the light illumination of the lamp 20 in the fluorescent light group, a significant reduction in the ant population is observed after one week, with only a few ants remaining.

Referring to FIG. 7, under the light illumination of the lamp 20 in the UV light group, not a single ant is observed after one week. It is clear that the UV light group shows the best result, indicating that UV light imposes a stronger interference effect on ants.

With the foregoing configuration, the present disclosure uses the lamp 20 to interfere with the activities of ants. Especially, with the use of UV light, whose wavelength ranges from 100 nm to 400 nm, the present disclosure has proven that UV light causes a significant interference effect on ants, greatly reducing or even completely eliminating ant activities within the box body 10. Such effect prevent ants from affecting or damaging the wirings, circuit boards, mechanical structures, cooling systems, liquids, sensors, connectors, piping, optical components, or even piano strings within the box body 10. Furthermore, by using physical light to interfere with the behaviors of ants, no chemicals are applied by the present disclosure, so that the present disclosure is environmentally friendly and non-toxic, and also avoids the risk of chemicals causing corrosion or conductivity issues in the equipment.

Although particular embodiments of the disclosure have been described in detail for purposes of illustration, various modifications and enhancements may be made without departing from the scope of the disclosure. Accordingly, the disclosure is not to be limited except as by the appended claims.

What is claimed is:

1. An ant control box, comprising:
   a box body having a housing space therein;
   a lamp disposed within the housing space and capable of emitting a light covering at least 80% of a total area of the housing space for interfering with activity of ants; and
   an odor sensing device disposed within the housing space, comprising:
   a gas sensor for detecting pheromone of ants;
   a microcontroller, electrically connected with the gas sensor and the lamp, for processing a signal from the gas sensor, wherein the microcontroller sends a signal to activate the lamp when the signal reaches a predetermined threshold value, the microcontroller sends a signal to shut down the lamp when the signal falls under the threshold value; and a sensitivity sensing unit, electrically connected with the gas sensor and the microcontroller, for adjusting a sensitivity of the gas sensor in detecting the pheromone of ants.

2. The ant control box of claim 1, wherein the lamp is selected from a group consisting of an LED light, ultraviolet light, fluorescent light, and a combination thereof.

3. The ant control box of claim 2, wherein the lamp comprises a control device, the control device adjusts a luminous intensity and an on and off state of the lamp.

4. The ant control box of claim 3, wherein the control device comprises a time control module, the time control module sets a scheduled on and off timing of the lamp.

5. The ant control box of claim 1, wherein a reflection layer is disposed on an inner surface of the box body.

6. The ant control box of claim 1, wherein a fan is disposed within the box body.

* * * * *